United States Patent [19]

Tsutsumikoshi et al.

[11] Patent Number: 4,650,203
[45] Date of Patent: Mar. 17, 1987

[54] STEERING APPARATUS FOR A SADDLE RIDING TYPE MOTORCAR HAVING FOUR WHEELS

[75] Inventors: Shinobu Tsutsumikoshi, Lamirada; Akira Goto, Fullerton, both of Calif.

[73] Assignee: Suzuki Motor Company Limited, Shizuoka, Japan

[21] Appl. No.: 800,370

[22] Filed: Nov. 22, 1985

Related U.S. Application Data

[63] Continuation of Ser. No. 487,314, Apr. 21, 1983, abandoned.

[51] Int. Cl.[4] ............................................. B62K 21/00
[52] U.S. Cl. .................................... 280/269; 180/311; 280/95 A; 280/276
[58] Field of Search .................... 180/89.1, 210, 215, 180/216, 217, 311, 312; 280/95 R, 95 A, 103, 267, 268, 269, 779, 781, 276

[56] References Cited

U.S. PATENT DOCUMENTS

| 1,347,337 | 7/1920 | Kline | 180/312 |
| 2,773,392 | 12/1956 | Cizek | 180/210 X |
| 2,800,189 | 7/1957 | Kummer | 280/281 R |
| 3,836,177 | 9/1974 | Heidt | 280/95 R X |
| 3,936,076 | 2/1976 | Probst | 280/276 |
| 3,958,814 | 5/1976 | Smith | 280/269 |
| 4,268,055 | 5/1981 | Bell | 280/281 R X |
| 4,325,449 | 4/1982 | D'Addio et al. | 180/210 X |
| 4,390,300 | 6/1983 | Foster | 280/279 X |
| 4,392,536 | 7/1983 | Iwai et al. | 280/282 X |
| 4,469,344 | 9/1984 | Coil | 280/269 |

FOREIGN PATENT DOCUMENTS

| 11510 | 11/1908 | Denmark | 280/279 |
| 1010747 | 6/1952 | France | 280/279 |
| 436536 | 6/1948 | Italy | 280/279 |
| 6397 | of 1899 | United Kingdom | 280/279 |

Primary Examiner—John J. Love
Assistant Examiner—Charles R. Watts
Attorney, Agent, or Firm—Holman & Stern

[57] ABSTRACT

A steering apparatus for a four-wheel motorcar of the saddle-ride type having two front wheels and two rear wheels, each wheel being fitted with a balloon tire, a front axle steerably supporting the front wheels, a car body connected together in an integral manner by a support frame, a steering shaft connected to the front wheels through a linkage mechanism, and a bearing portion in a head pipe rotatably supporting the upper end portion of the steering shaft integral with said support frame, the lower end portion of the steering shaft being rotatably supported by the front axle.

2 Claims, 4 Drawing Figures

STEERING APPARATUS FOR A SADDLE RIDING TYPE MOTORCAR HAVING FOUR WHEELS

This is a continuation of application Ser. No. 487,314, filed Apr. 21, 1983, now abandoned.

BACKGROUND OF THE INVENTION

1. Field of the Invention

The present invention relates to a saddle riding type motorcar having two front wheels and two rear wheels and more particularly to a steering apparatus for a saddle riding type motorcar having four wheels which is adapted to support any load by means of a bearing portion fixedly secured to a frame structure of the motorcar, said load being exerted on a steering shaft by a handlebar.

2. Description of the Prior Art

A saddle riding type motor car having four wheels which is designed to run stably without any loss in maneuverability experienced with a motorcycle has been used for running on a rugged land or ground. When a driver makes a quick turn with the motorcar of the above-mentioned type, the dead weight of his body is caused to move and thereby a considerably heavy load is transmitted to the support portion of the steering shaft. Thus, the support portion is required to have a sufficiently high strength.

BRIEF SUMMARY OF THE INVENTION

The present invention has been made with the foregoing background in mind and it is an object of the present invention to provide a steering apparatus for a saddle riding type motorcar having four wheels which assures smooth steering operation. Specifically, a characterizing feature of the present invention consists in that the two front wheels are steerably supported at both the side ends of a fore axle while they are operatively connected to a steering shaft by way of a link mechanism, said steering shaft being rotatably supported by means of a bearing portion at the upper end part thereof, said bearing portion being fixedly secured to a frame structure of the motorcar. In this invention, shock from the surface of the road during running operation of the motorcar is dispersed and transmitted to the car body through the wheels, axle and support frame in order that such shock does not directly affect the handlebar being operated by the driver and at the same time, the load due to steering force and movement of body weight of the driver is received by a bearing portion without transmitting such load to the steering shaft thereby ensuring smooth steering operation.

In this invention, shock from the surface of the road during running operation of the motor car is dispersed and transmitted to the car body through the wheels, axle and support frame in order that such shock does not directly affect the handlebar being operated by the driver and at the same time, the load due to steering force and movement of body weight of the driver is received by a bearing portion without transmitting such load to the steering shaft thereby ensuring smooth steering operation.

BRIEF DESCRIPTION OF THE DRAWINGS

These objects, features and advantages will be more clearly apparent from reading of the following description with reference to the accompanying drawings wherein.

DETAILED DESSCRIPTION

Figure 1:
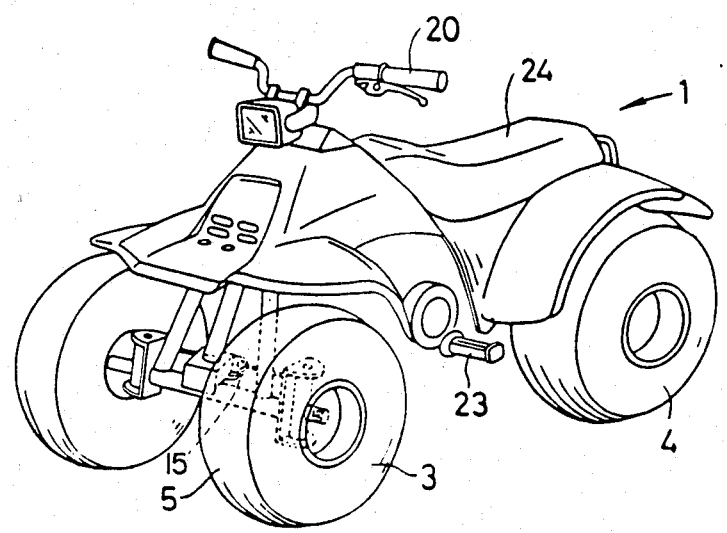
FIG. 1 is a perspective view illustrating a saddle riding type motorcar having four wheels to which the present invention is applied.
Figure 2:
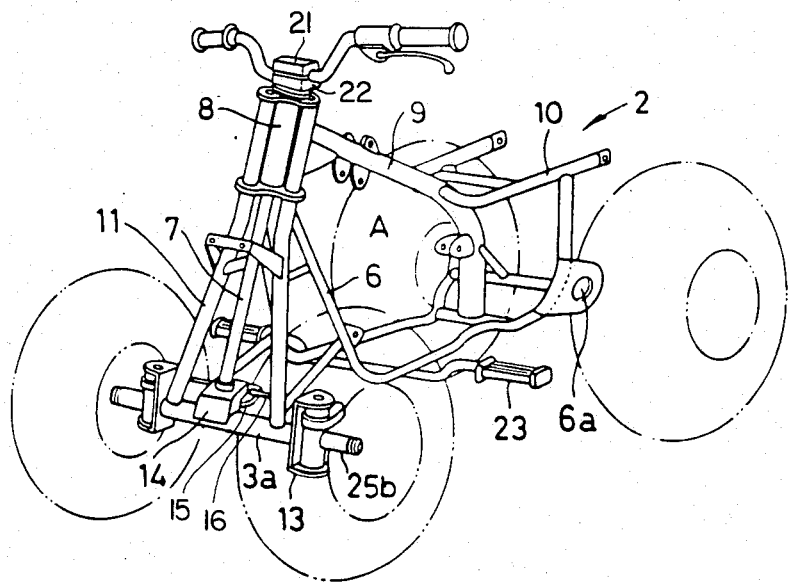
FIG. 2 is a perspective view illustrating a frame structure for the saddle riding type motorcar of FIG. 1 with a steering apparatus of the invention mounted thereon.
Figure 3:
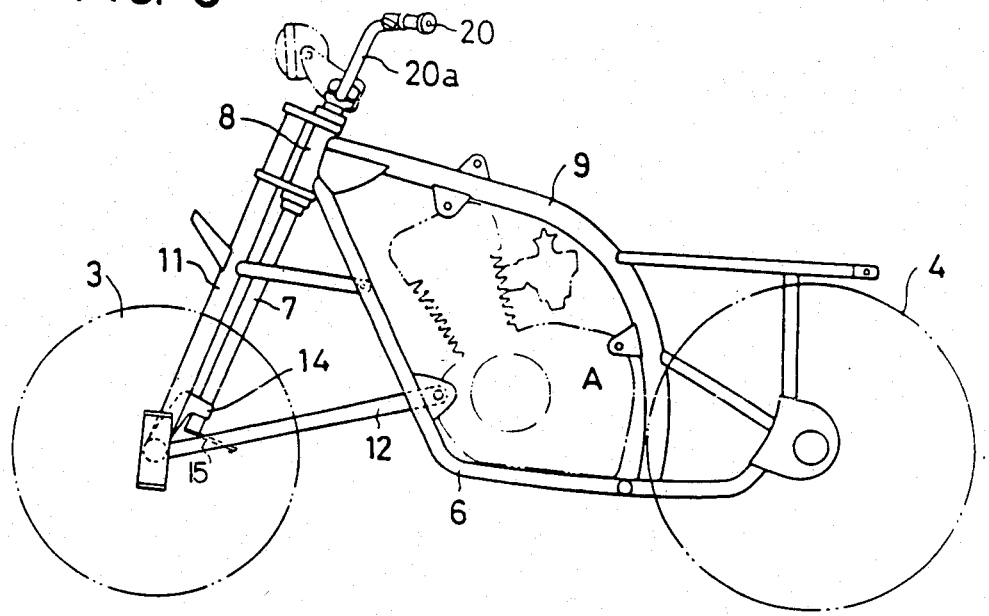
FIG. 3 is a schematic side elevational view of the frame structure in FIG. 2.

In FIG. 1 reference numeral 1 designates a car body designed in the form of a saddle type. The body 1 includes a frame 2 as illustrated in FIG. 2 on which two front wheels 3 and two rear wheels 4 are rotatably mounted. Each of the front and rear wheels 3 and 4 is equipped with a so-called balloon tire 5 which is filled with compressed air at a lower pressure and has a wide contact surface in contact with the ground.

The frame 2 is designed on the basis of a fundamental structural concept derived from, for instance, backbone type frame, diamond type frame, cradle type frame or the like conventional frame. Specifically, the frame 2 is modified from the conventional one particularly for a motorcar having four wheels.

The frame 2 as illustrated in FIG. 2 is designed on the basis of a fundamental structural concept derived from a so-called double cradle type frame including two down-frames 6 which carry a bearing portion 8 at the uppermost end thereof through which a steering shaft 7 extends and is rotatably supported therein. A single tank rail frame 9 constituting a backbone for the frame 2 is fixedly connected to the bearing portion 8, or head pipe, at its foremost end, and fixedly connected to two upper frames 10 at its rearmost end on which a saddle riding seat 24 is mounted. The down-frames 6 are bent upward at the rear end part and are fixedly connected to the upper frames 10. An engine mounting section A is formed in the hollow space defined by both the down-frames 6 and the upper frames 10. Further, two wheel axle supporting frames 11 extend downwardly at a certain inclination angle through both the side end parts of the bearing portion 8 and a wheel axle 3a for the front wheels 3 is held by means of the wheel axle supporting frames 11 at their lower ends with the aid of auxiliary frames 12 which extend rearwardly and are fixedly connected to the midway part of the down-frames 6. The wheel axle 3a has U-shaped brackets 13 fixedly secured to both the end parts thereof and a king pin (not shown) is inserted vertically through each bracket 13 and a wheel mounting shaft member 25b so that the front wheels 3 are steerably supported as shown in FIGS. 1 and 2. Wheel axle 3a includes a support arm 14 at its middle part which rotatably supports the lower end part of the steering shaft 7. This steering shaft 7 is fitted with a center steering arm 15 at the lowermost end so that it turns in response to rotation of the steering shaft 7, center steering arm 15 being operatively connected to the front wheels 3 via a known type of steering linkage, including link mechanism 16.

Figure 4:
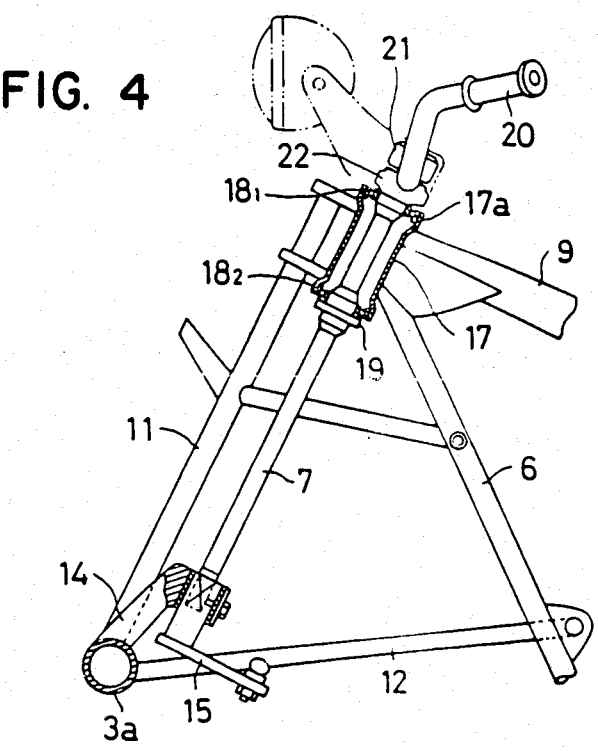
FIG. 4 is a vertical cross-sectional view illustrating the steering apparatus of the invention.

As will be apparent from FIG. 4, the bearing portion, or head pipe, 8 is adapted to rotatably support the upper end part of the steering shaft 7 and comprises a support pipe 17 with stepped portions 17a formed at both the upper and lower open ends and bearings $18_1$ and $18_2$ such as angular contact bearings or the like fitted into stepped portions 17a. Alternatively, thrust bearings, ball bearings or roller bearings may be employed for the bearings 18 and 18. The steering shaft 7 is formed with a male threaded portion (not shown) at the upper end part onto which a nut 19 is screwed and moreover includes a handlebar holder 21 and a handlebar bracket 22 for holding a handlebar 20 thereon, holder 21 and bracket 22 being located above said mail threaded portion. Owing to the foregoing arrangement the steering shaft 7 is rotatably supported in the bearing portion 8 with the aid of the bracket 22 and the nut 19. It is of course understood that not only the handlebar 20 but any suitable type of steering handle may be employed.

A step bar 23 is disposed below the down-frames 6 and support portions 6a are provided at the rear end part of the down-frames 6 for holding a driving axle (not shown).

As will be readily understood from the above description, load exerted on the handlebar 20, such as the dead weight of a driver's body displaced forward during running, is supported by the handlebar bracket 22 engaging the upper end portion of the bearing portion 8 through upper bearing $18_1$. When the front wheels 3 are intentionally lifted up, the upward load will be supported by the nut 19 on the steering shaft 7 engaging the lower end portion of the bearing portion 8 through bearing $18_2$.

Since the steering apparatus of the invention for a saddle riding type motorcar having four wheels is constructed to firmly support the load to be exerted on the handle in any direction with the aid of a bearing portion, it is assured that any variable load during displacement of the dead weight of a driver's body can be safely supported while a smooth steering operation is maintained during running.

With the aforesaid structure of the present invention, shock occurring from the surface of rough land during running operation of the car is dispersed and transmitted to the car body 2 through both right and left front wheels 3, axle 3a and support frame 11. Therefore, the dispersion of shock to the driver through the steering shaft directly from the wheels is small because only a dispersed load is transmitted to the steering shaft and linking mechanism, thus ensuring the use of the car for a long period of time without causing damage. Also, the load imposed on the handlebar 20 by movement of the driver's body weight is transmitted to the steering shaft through the handlebar but no large load will be directly imposed on the steering shaft itself because the steering shaft has its upper end and lower end supported by the car body through bearings $18_1$, $18_2$ and through the axle 3a, respectively. Accordingly, it is possible to reduce the size of the steering shaft to a minimum and since the steering shaft is not liable to be transformed in shape by bending, it has the capability of continuous smooth steering operation.

With the aforesaid structure of the present invention, shock occurring from the surface of rough land during running operation of the car is dispersed and transmitted to the car body 2 through both right and left front wheels 3, axle 3a and support frame 11. Therefore, the dispersion of shock to the driver through the steering shaft directly from the wheels is small because only a load is transmitted to the steering shaft and linking mechanism, thus ensuring the use of the car for a long period of time without causing damage. Also, the load imposed on the handlebar 20 by movement of the driver's body weight transmitted to the steering shaft through the handlebar but no large load will be directly imposed on the steering shaft itself because the steering shaft has its upper end and lower end supported by the car body through the bearings 18, 18 and through the axle 3a, respectively. Accordingly, it is possible to reduce the size of the steering shaft to a minimum and since the steering shaft is not liable to be transformed in shape by bending, it has the capability of continuous smooth steering operation.

We claim:

1. In a motor car having two front wheels and two rear wheels supported on a car body having front and real ends, each wheel having a balloon tire mounted thereon, a saddle riding seat mounted on the car body, a support member forward of the seat for rotatably supporting a steering shaft having a handlebar thereon, and a steering linkage connecting the steering shaft to the front wheels, the improvement comprising:

a steering shaft and bearing support tube mounted to the front end of the car body and having upper and lower end portions and a central axis extending downwardly and upwardly, the steering shaft extending through said support tube and extending downwardly therefrom;

upper and lower ends on said steering shaft;

upper and lower bearings mounted in axially spaced relationship within said support tube and positioned adjacent said upper and lower ends thereof, said steering shaft being rotatably supported at the upper end thereof by said bearings;

two elongated support frames mounted at the front end of said car body, one on each opposite side of said support tube and extending downwardly with respect to said support tube in spaced relation to said steering shaft;

upper and lower ends on each support frame;

a front wheel axle secured to the lower ends of said support frames, said axle having outer ends;

means on the outer ends of said front wheel axle for supporting the front wheels rotatably and to facilitate turning the wheels with respect to the axle for steering the car;

support arm means on said front wheel axle between said support frames and extending rearwardly of said front wheel axle for rotatably supporting said steering shaft near said lower end thereof;

a steering linkage connector arm on the lower end of said steering shaft and extending rearwardly of said front wheel axle;

a steering linkage operatively connecting said connector arm to said front wheel supporting means so that said car is steered by the handlebar;

a handlebar bracket fixedly mounted on said steering shaft for supporting said handlebar;

means on said handlebar bracket for engaging the upper end portion of said support tube through said upper bearing when downward force is applied to said steering shaft.

an adjustable abutment member adjustably mounted on said steering shaft adjacent said lower end portion of said support tube; and means on said abutment member for engaging the lower end portion of said support tube through said lower bearing when upward force is applied to said steering shaft.

2. An improvement in a motor car as claimed in claim 1 wherein said means for supporting the front wheels at each outer end of said front wheel axle comprises:

a U-shaped support bracket connected to the respective outer end of said front wheel axle;

a wheel mounting shaft member; and kingpin means inserted through said U-shaped support bracket for steerably supporting each front wheel.

* * * * *